(12) United States Patent
Lee et al.

(10) Patent No.: US 12,479,331 B2
(45) Date of Patent: Nov. 25, 2025

(54) ELECTRIFIED VEHICLE AND METHOD FOR CONTROLLING THE SAME

(71) Applicants: Hyundai Motor Company, Seoul (KR); Kia Corporation, Seoul (KR)

(72) Inventors: Yong Jae Lee, Whasung-Si (KR); Young Kwan Ko, Whasung-Si (KR); Byung Kwan Son, Whasung-Si (KR); Jang Yoon Jeong, Whasung-Si (KR); Ho Tae Chun, Whasung-Si (KR); Yoo Jong Lee, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 206 days.

(21) Appl. No.: 18/218,723

(22) Filed: Jul. 6, 2023

(65) Prior Publication Data
US 2024/0190294 A1 Jun. 13, 2024

(30) Foreign Application Priority Data
Dec. 8, 2022 (KR) .................. 10-2022-0170862

(51) Int. Cl.
*B60L 58/20* (2019.01)
*B60L 58/19* (2019.01)
*H02J 7/00* (2006.01)
*H02J 7/34* (2006.01)
*H02P 27/08* (2006.01)

(52) U.S. Cl.
CPC .............. *B60L 58/20* (2019.02); *B60L 58/19* (2019.02); *H02J 7/0068* (2013.01); *H02J 7/345* (2013.01); *H02P 27/08* (2013.01); *B60L 2210/40* (2013.01); *B60L 2220/56* (2013.01); *B60L 2240/427* (2013.01)

(58) Field of Classification Search
CPC .. B60L 58/19; B60L 2210/40; B60L 2220/56; B60L 2240/427; B60L 53/22; B60L 53/24; B60L 15/20; B60L 50/60; B60L 53/00; B60L 58/18; H02J 7/0068; H02J 7/345; H02J 7/342; H02P 27/08; H02M 7/5395; B60Y 2200/91; Y02T 10/64; Y02T 10/70; Y02T 10/7072; Y02T 10/72
See application file for complete search history.

(56) References Cited

U.S. PATENT DOCUMENTS

2018/0334043 A1* 11/2018 Zou .................. H02M 1/08
2024/0178690 A1* 5/2024 Huang ................ H02J 7/007

FOREIGN PATENT DOCUMENTS

| JP | 2010-011522 | 1/2010 |
|---|---|---|
| JP | 2015-115978 | 6/2015 |
| JP | 6259534 | 1/2018 |

(Continued)

*Primary Examiner* — Michael C Zarroli
(74) *Attorney, Agent, or Firm* — Morgan Lewis & Bockius LLP (57) ABSTRACT

An electrified vehicle includes a motor including a plurality of windings corresponding to each of phases; an inverter including a DC terminal connected to a main battery, and a plurality of legs connected to each end of the windings; a charging switch connected between one electrode of an auxiliary battery and a neutral terminal of the motor; and a controller configured to turn on the charging switch and to apply a DC offset to each of phase currents of the motor having the phases when the charging mode is performed while driving.

17 Claims, 11 Drawing Sheets

(56) References Cited

FOREIGN PATENT DOCUMENTS

| KR | 10-2019-0119778 | 10/2019 |
| KR | 10-2024-0092676 | 6/2024 |
| WO | WO2015/176571 | 11/2015 |

* cited by examiner

ELECTRIFIED VEHICLE AND METHOD FOR CONTROLLING THE SAME

CROSS REFERENCE TO RELATED APPLICATION

The present application claims priority to Korean Patent Application No. 10-2022-0170862, filed Dec. 8, 2022, the entire contents of which is incorporated herein for all purposes by this reference.

BACKGROUND OF THE PRESENT DISCLOSURE

Field of the Present Disclosure

The present disclosure relates to an electrified vehicle and a method for controlling the same, provided with a main battery and an auxiliary battery.

Description of Related Art

According to the trend in reducing carbon dioxide emissions around the globe, recently, the demand for electrified vehicles generating the driving power by driving a motor with electrical energy stored in a battery instead of a typical internal combustion engine generating the driving power through fossil fuels has increased significantly.

The electrified vehicle requires a relatively long time to charge the battery compared to the refueling time of the internal combustion engine vehicle. Therefore, a maximum traveling distance which may be driven through a single battery charge is important.

The maximum traveling distance of the electrified vehicle may vary depending on the voltage and capacity of the battery. Although the battery has the same capacity, the voltage and the amount of charge may differ depending on the combination of series or parallel connections between the modules or cells. For example, the voltage of the battery corresponds to the voltage of the battery cell multiplied by the number of cells connected in series, and the amount of charge of the battery may correspond to a value obtained by multiplying the amount of charge of the battery cells by the number of cells connected in parallel.

In the case of the voltage of the battery being higher than the voltage design standard, a motor system of the electrified vehicle may produce the maximum available output. However, the voltage of the battery is lower than the voltage design standard, and the available output may be limited. The limited available output may cause a degradation in the power performance of the electrified vehicle. Accordingly, a method for increasing the battery voltage may be considered. However, because designing the withstanding voltage of the motor system has to be enhanced when the voltage of the battery increases, such a method also has limitations.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electrified vehicle and a method for controlling the same, provided with a main battery and an auxiliary battery.

It is a technical object of the present disclosure to efficiently increase the traveling distance of an electrified vehicle by charging a main battery with an auxiliary battery through a motor system while driving.

The technical objects to attain in an exemplary embodiment of the present disclosure are not limited to the above-described technical objects and other technical objects which are not described herein will become apparent to those skilled in the art from the following description.

Various aspects of the present disclosure are directed to providing an electrified vehicle that includes a motor including a plurality of windings corresponding to each of phases; an inverter including a DC terminal connected to a main battery, and a plurality of legs connected to each end of the windings; a charging switch connected between one electrode of an auxiliary battery and a neutral terminal of the motor; and a controller configured to turn on the charging switch and to apply a DC offset to each of phase currents of the motor having the phases when the charging mode is performed while driving.

Furthermore, various aspects of the present disclosure are directed to providing a method for controlling an electrified vehicle including: driving a motor including a plurality of windings corresponding to each of phases through an inverter based on the voltage of a main battery when a motor driving mode is performed; changing the motor driving mode to a charging mode during the driving by electrically connecting one electrode of an auxiliary battery and a neutral terminal of the motor; and applying a DC offset to each of phase currents of the motor having the phases when the charging mode during the driving is performed.

According to an exemplary embodiment of the present disclosure, the traveling distance of an electrified vehicle may be efficiently increased by charging a main battery with an auxiliary battery through a motor system during the driving.

Advantages which may be obtained in the present specification are not limited to the aforementioned advantages, and various other advantages may be evidently understood by those skilled in the art to which an exemplary embodiment of the present disclosure pertains from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in greater detail with reference to the accompanying drawings. In describing the present disclosure, for ease of understanding, the same reference numerals are used to denote the same components throughout the drawings, and repetitive description on the same components will be omitted.

In the description of the following embodiments, the term "preset" means that the numerical value of a parameter is determined in advance when the parameter is used in a process or algorithm. Depending on an exemplary embodiment of the present disclosure, the numerical value of a parameter may be set when a process or algorithm starts or may be set during a period in which the process or algorithm is executed.

In the following description, with respect to constituent elements used in the following description, suffixes "module" and "unit" are provided in consideration of only facilitation of description and do not have meaning or functions discriminated from each other.

In terms of describing the exemplary embodiments of the present disclosure, detailed descriptions of related art will be omitted when they may make the subject matter of the exemplary embodiments of the present disclosure rather unclear. Furthermore, the accompanying drawings are provided only for a better understanding of the exemplary embodiments disclosed in the present specification and are not intended to limit technical ideas disclosed in the present specification. Therefore, it should be understood that the accompanying drawings include all modifications, equivalents and substitutions within the scope and spirit of the present disclosure.

Terms such as "first" and "second" may be used to describe various components, but the components should not be limited by the above terms. Furthermore, the above terms are used only for distinguishing one component from another.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is directed to include the plural forms as well, unless context clearly indicates otherwise.

In the present application, it will be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof.

Furthermore, terms "unit" or "control unit" forming portion of the names of a motor control unit (MCU), a hybrid control unit (HCU), etc. are merely terms that are widely used in the naming of a controller configured for controlling a predetermined function of a vehicle and should not be construed as meaning a generic function unit. For example, each controller is a communication device that communicates with other controllers or sensors to control the function which is responsible for, a memory that stores an operating system or logic commands and input and output information, and one or more processor that is configured to perform determination, calculation, decision, and the like, which is necessary for the control the function which is responsible therefor.

Figure 1:
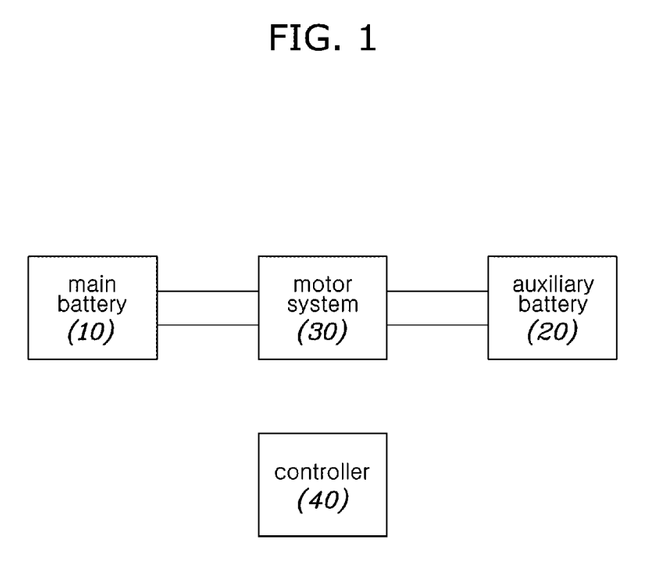
FIG. 1 is a view showing a battery charging system of an electrified vehicle according to various exemplary embodiments of the present disclosure.

FIG. 1 is a view showing a battery charging system of an electrified vehicle according to various exemplary embodiments of the present disclosure.

As shown in FIG. 1, the battery charging system of the electrified vehicle may include a main battery 10, an auxiliary battery 20, a motor system 30, and a controller 40.

The motor system 30 includes a motor and an inverter and may be connected between the main battery 10 and the auxiliary battery 20. The motor system 30 may drive the motor through the inverter based on the voltage of the main battery 10 in the motor driving mode. Furthermore, the motor system 30 drives the motor through an inverter based on the voltage of the main battery 10 in the charging mode while driving, the power of the auxiliary battery 20 electrically connected to the neutral terminal of the motor is transmitted to the main battery 10, or the power of the main battery 10 may be transmitted to the auxiliary battery 20.

The controller 40 may control the switching state and the like of the inverter included in the motor system 30. In the implementation, the controller 40 may be implemented as a single controller or may be implemented in a form in which functions thereof are distributed to a plurality of controllers. For example, the controller 40 may be implemented as a motor control unit (MCU) that is configured to control the motor of the motor system 30 and upper-level controllers thereof combined (e.g., a hybrid control unit (HCU), a vehicle control unit (VCU), a fuel cell control unit (FCCU), and the like), but is not necessarily limited thereto. According to another implementation, the controller 40 may further include a charging controller.

As described above, the motor system 30 drives the motor through the inverter based on the voltage of the main battery 10 in the charging mode while driving and may control the voltage transfer between the main battery 10 and the auxiliary battery 20. A structure therefor is illustrated in FIG. 2.

Figure 2:
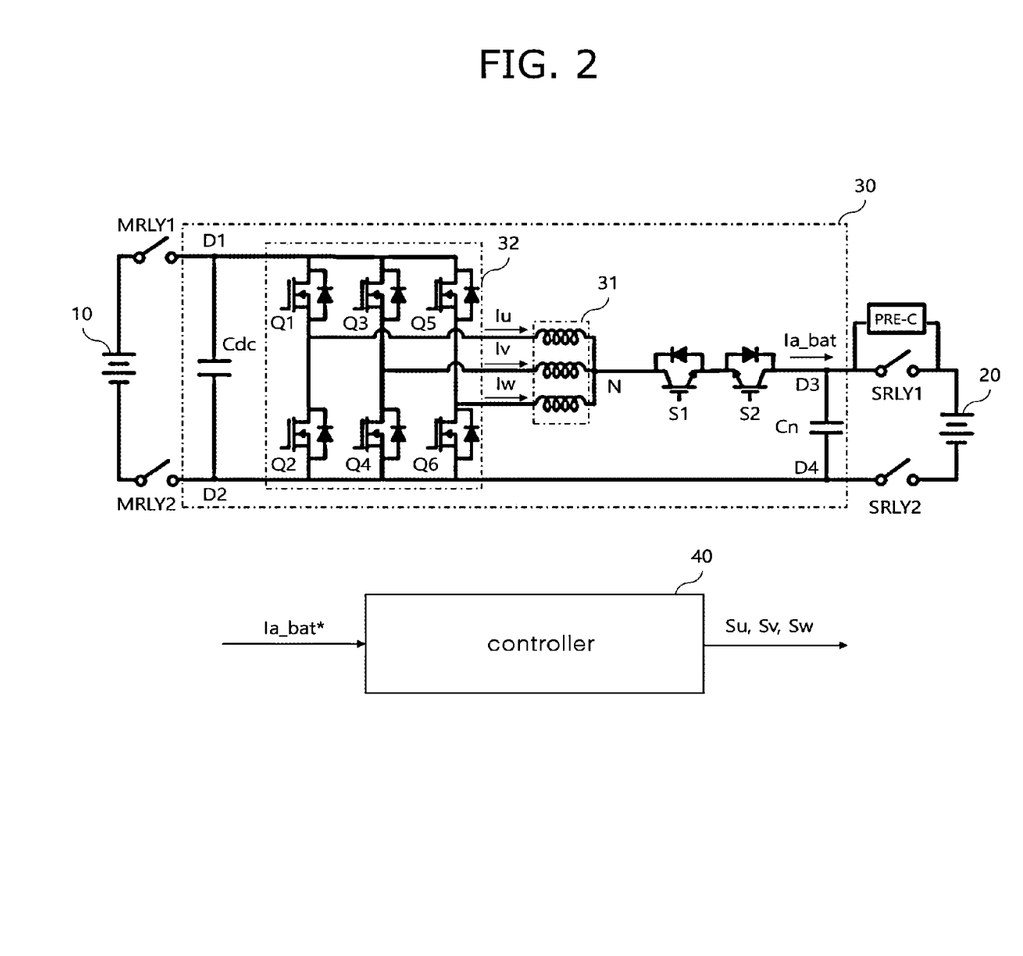
FIG. 2 is a circuit diagram showing a configuration of a motor system according to various exemplary embodiments of the present disclosure.

FIG. 2 is a circuit diagram showing a configuration of a motor system according to various exemplary embodiments of the present disclosure.

Referring to FIG. 2, the motor system 30 may include a motor 31, an inverter 32, a charging switches S1 and S2, a DC capacitor Cdc and Cn. Furthermore, the motor system 30 has DC terminals D1 and D2 connected through the main battery 10 and main relays MRLY1 and MRLY2, and DC terminals D3 and D4 connected through the auxiliary battery 20 and sub relays SRLY1 and SRLY2.

The main relay MRLY1 is connected between the positive electrode of the main battery 10 and the DC terminal D1, and the main relay MRLY2 may be connected between the negative electrode of the main battery and the DC terminal D2. The DC capacitor Cdc may be connected between the DC terminal D1 and the DC terminal D2 to reduce ripple current of the main battery 10.

The sub relay SRLY1 is connected between the positive electrode of the auxiliary battery 20 and the DC terminal D3, and the sub relay SRLY2 may be connected between the negative electrode of the auxiliary battery and the DC terminal D4. The DC capacitor Cn may be connected between the DC terminal D3 and the DC terminal D4 to reduce ripple current of the auxiliary battery 20. An initial charging circuit PRE-C may be connected in parallel with the sub relay SRLY1 between the positive electrode of the auxiliary battery 20 and the DC terminal D3. The initial charging circuit PRE-C may be implemented as a circuit in which the resistor and the relay are connected in series, but is not necessarily limited thereto.

The motor 31 may include a plurality of windings corresponding to each of phases.

The inverter 32 may include the DC terminals D1 and D2 connected through the main battery 10 and the main relays MRLY1 and MRLY2 and may include a plurality of legs Q1-Q2, Q3-Q4, and Q5-Q6 connected to each of the windings included in the motor 31.

The charging switches S1 and S2 may be connected in series between the neutral terminal N of the motor 31 and the positive electrode of the auxiliary battery 20. In more detail, a collector terminal of the charging switch S1 is connected to the neutral terminal N, and the collector terminal of the charging switch S2 is connected to the positive electrode of the auxiliary 20 through the sub relay SRLY1, and an emitter terminal of each of the charging switches S1 and S2 may be mutually connected to form a common node. Accordingly, a diode for each of the charging switches S1 and S2 may interrupt the current at the neutral terminal N from flowing to the DC terminal D3 when the charging switches S1 and S2 are in the turn-off state. In an exemplary embodiment of the present disclosure, the charging switches S1 and S2 are implemented as insulated gate bipolar transistors (IGBT) but may be implemented as a metal-oxide-semiconductor field-effect transistor (MOSFET) according to an exemplary embodiment of the present disclosure.

The controller 40 may switch each of the legs Q1-Q2, Q3-Q4, and Q5-Q6 by outputting a plurality of switching signals Su, Sv, and Sw corresponding to each of the phases.

Hereinafter, an operation method in which the controller 40 is configured to control the motor system 30 for each of the motor driving mode and the charging mode while driving will be described.

When the motor driving mode is performed, the controller 40 may electrically separate the neutral terminal N of the motor 31 and the positive electrode of the auxiliary battery 20 by turning off the charging switches S1 and S2. Furthermore, when the motor driving mode is performed, the controller 40 may output the plurality of switching signals Su, Sv, and Sw by controlling a space vector pulse width modulation (SVPWM) without DC offset for each of the phase currents Iu, Iv, and Iw of the motor 31. The controller 40 may set a value of zero-phase current command for the DC offset to '0'. The SVPWM control may be implied as a method for synthesizing a reference voltage vector using two effective voltage vectors adjacent to the reference voltage vectors along with a zero-voltage vector in a complex space.

When the charging mode is performed while driving, the controller 40 may electrically connect the neutral terminal N of the motor 31 and the positive electrode of the auxiliary battery 20 by turning on the charging switches S1 and S2. Furthermore, when the charging mode is performed while driving, the controller 40 may apply a DC offset to each of the phase currents Iu, Iv, and Iw of the motor 31 having a plurality of phases based on a charging current command Ia_bat* for the auxiliary battery 20.

When the charging mode is performed while driving, the controller 40 divides the value of the charging current command Ia_bat* by the number of phases (e.g., three), generate a zero-phase current command for a DC offset, and output the plurality of switching signals Su, Sv, and Sw based on the zero-phase current command.

Figure 3:
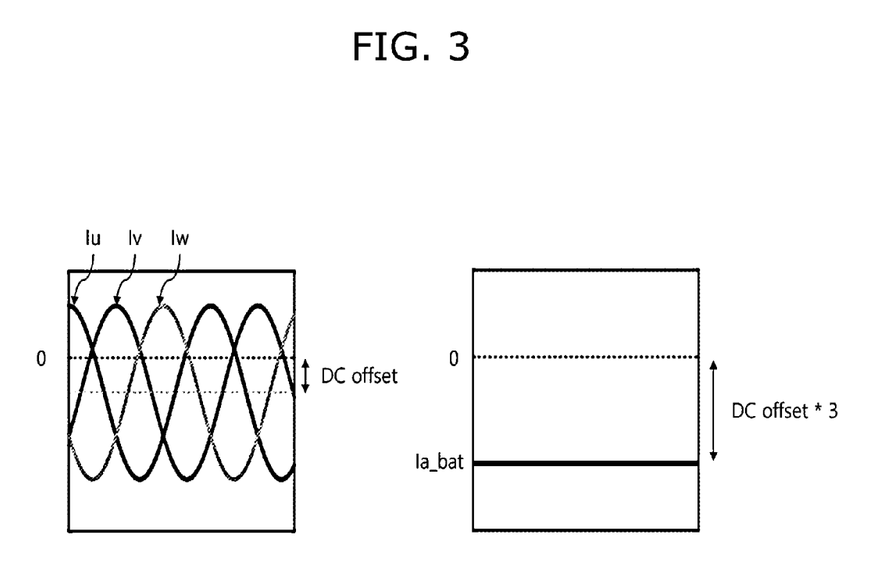
FIG. 3 is a waveform diagram of a phase current of a motor and a current of an auxiliary battery when a charging mode is performed while driving according to various exemplary embodiments of the present disclosure.

Referring to FIG. 3, when the charging mode is performed while driving, examples of waveforms for the phase currents Iu, Iv, and Iw of the motor 31 and the charging current Ia_bat of the auxiliary battery 20 are shown. Each of the phase currents Iu, Iv, and Iw of the motor includes a DC offset, and may have phase difference of 120°. The charging current Ia_bat is equal to a sum of the phase currents Iu, Iv, and Iw and may include a DC waveform in which the DC offset is multiplied by the number of phases (e.g., three). Accordingly, when the controller 40 applies the negative of DC offset to each of the phase currents Iu, Iv, and Iw of the motor 31, the charging current Ia_bat is outputted from the auxiliary battery 20 to the main battery 10, so that the motor system 30 may transfer the power of the auxiliary battery 20 to the main battery 10. In contrast, when the controller 40 applies the positive of the DC offset to each of the phase currents Iu, Iv, and Iw of the motor 31, the charging current Ia_bat is output from the main battery 10 to the auxiliary battery 20, so that the motor system 30 may transmit the power of the main battery 10 to the auxiliary battery 20.

When charging mode is performed while driving, the controller 40 may output the plurality of switching signals Su, Sv, and Sw for applying the DC offset to each of the current phases Iu, Iv, and Iw of the motor 31 through a preset pulse width modulation control. In an exemplary embodiment of the present disclosure, the preset pulse width modulation control may be set as one of a space vector pulse width modulation (SVPWM) control or a remote state pulse width modulation (RSPWM) control. Here, the RSPWM control may be implied as synthesizing the reference voltage vector using three effective voltage vectors including 120° phase differences in a complex space.

Figure 4:
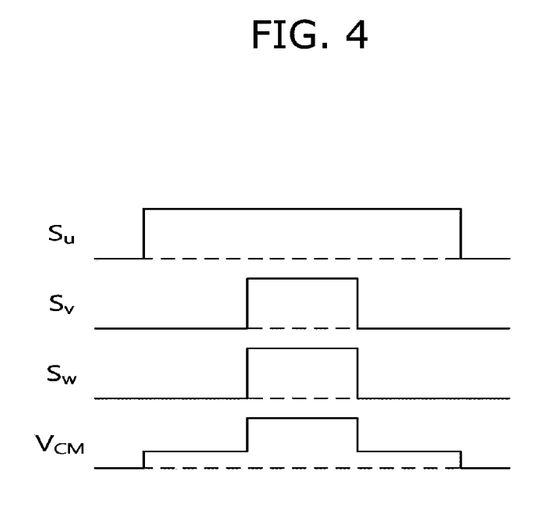
FIG. 4 and FIG. 5 are waveform diagrams for describing an operation in which a controller according to various exemplary embodiments of the present disclosure is configured to control a switching state of an inverter in a charging mode while driving.

Referring to FIG. 4, when controller 40 performs the SVPWM control, examples of waveforms of the plurality of switching signals Su, Sv, and Sw and common mode voltage $V_{CM}$ are shown. Each of the Su, Sv, and Sw may include a center-aligned waveform within one duty cycle. When the SVPWM control is performed, the maximum amplitude of the common mode voltage $V_{CM}$ may correspond to the voltage of the main battery 10. Here, the common mode voltage $V_{CM}$ may correspond to the potential difference between the ground terminal and the neutral terminal N.

Figure 5:
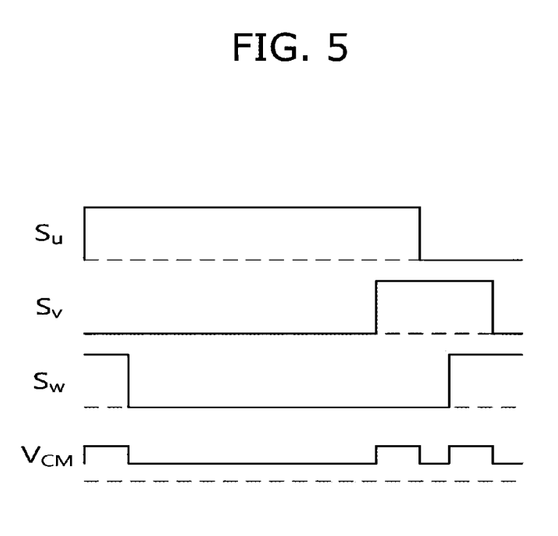

Referring to FIG. 5, when controller 40 performs the RSPWM control, examples of waveforms of the plurality of switching signals Su, Sv, and Sw and common mode voltage $V_{CM}$ are shown. When the RSPWM control is performed, the maximum amplitude of the common mode voltage $V_{CM}$ may correspond to the value in which voltage of the main battery 10 is divided into three. That is, because the RSPWM control method in FIG. 5 generates less pulsation of the common mode voltage $V_{CM}$ than the SVPWM control method in FIG. 4, the controller 40 can reduce the current ripple generated at the neutral terminal of the motor 31 through RSPWM control in the charging mode while driving.

Hereinafter, referring back to FIG. 2, an operation method for controlling the motor system 30 when the controller 40 changes modes between the motor driving mode and the charging mode while driving will be described.

In the case of the motor driving mode is changed to the charging mode while driving, the controller 40 may initially charge the DC capacitor Cn connected between the positive and negative electrodes of the auxiliary battery 20 through the initial charging circuit PRE-C connected to the auxiliary battery 20. After initially charging the DC capacitor Cn, the controller 40 may switch each of the legs Q1-Q2, Q3-Q4, Q5-Q6 based on the plurality of switching signals Su, Sv, and Sw to switch the voltage of the neutral terminal N (i.e., a common mode voltage) to be set as the voltage of the auxiliary battery 20. The controller 40 may change the pulse width modulation control method to the preset pulse width modulation control (e.g., RSPWM) method from the SVPWM control method. Thereafter, the controller 40 turns on the charging switches S1 and S2, which are in the turn-off state, and may apply the DC offset to each of the phase currents Iu, Iv, and Iw of the motor 31 according to the value of the charging current command Ia_bat*.

In the case that the charging mode is changed to the motor driving mode while driving, the voltage of the neutral terminal N may be maintained by switching each of the legs Q1-Q2, Q3-Q4, and Q5-Q6 based on the plurality of switching signals Su, Sv, and Sw, after the controller 40 sets the value of the zero-phase current command for the DC offset to '0'. The controller 40 may turn off the charging switches S1 and S2 in the turn-on state. When the charging switches S1 and S2 are turned off, the controller 40 may switch each of the legs Q1-Q2, Q3-Q4, and Q5-Q6 based on the plurality of switching signals Su, Sv, and Sw through the SVPWM control.

Figure 6:
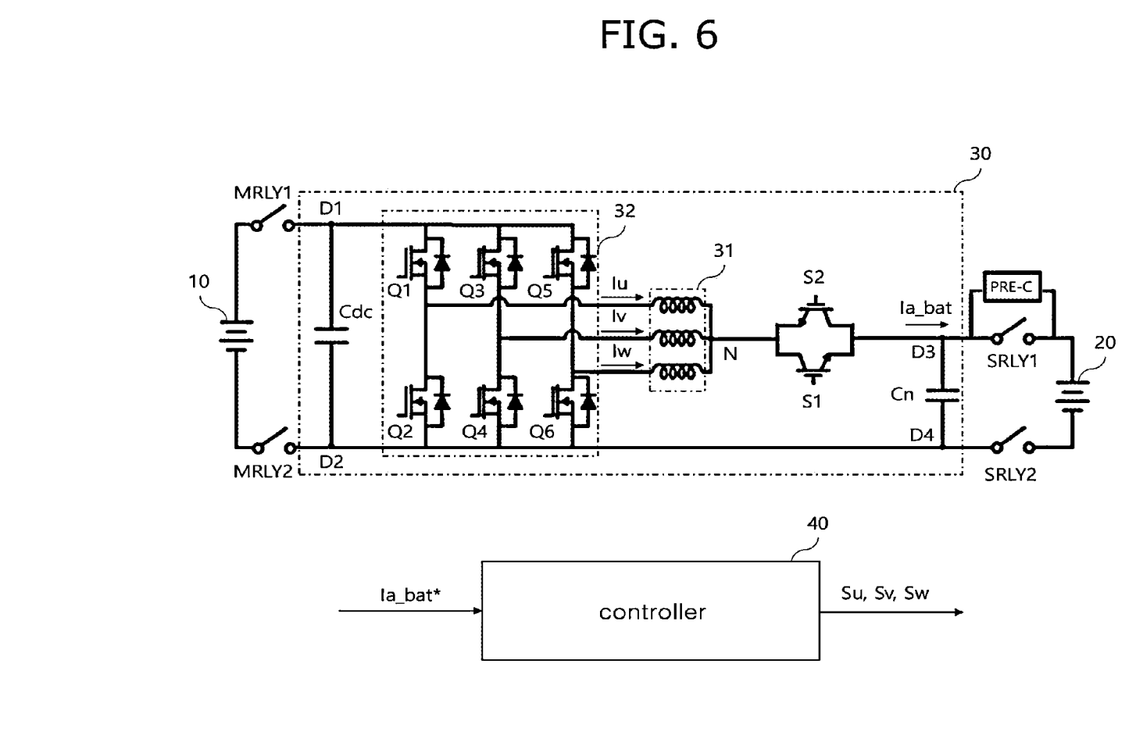
FIG. 6 is a circuit diagram showing a configuration of a motor system according to various exemplary embodiments of the present disclosure.

FIG. 6 is a circuit diagram showing a configuration of a motor system according to various exemplary embodiments of the present disclosure.

Referring to FIG. 6, the charging switches S1 and S2 may be connected in parallel between the neutral terminal N of the motor 31 and the positive electrode of the auxiliary battery 20. The emitter terminal of the charging switch S1 and the emitter terminal of the charging switch S2 are connected to the neutral terminal N, and the emitter terminal of the charging switch S1 and the collector terminal of the charging switch S2 are connected to the positive electrode of the auxiliary battery 20 through the sub relay SRLY1. Accordingly, the charging switches S1 and S2 may electrically separate the neutral terminal N and the DC terminal D3 in the turn-off state. In the connection configuration in FIG. 6, when the charging switches S1 and S2 are turned on, any one of the charging switches S1 and S2 are in the conductive state according to the current direction neutral terminal N, and thus, the conduction loss of the charging switches S1 and S2 are minimized. Here, the charging switches S1 and S2 may be implemented as a transistor (e.g., IGBT) with no reverse conduction characteristics.

Figure 7:
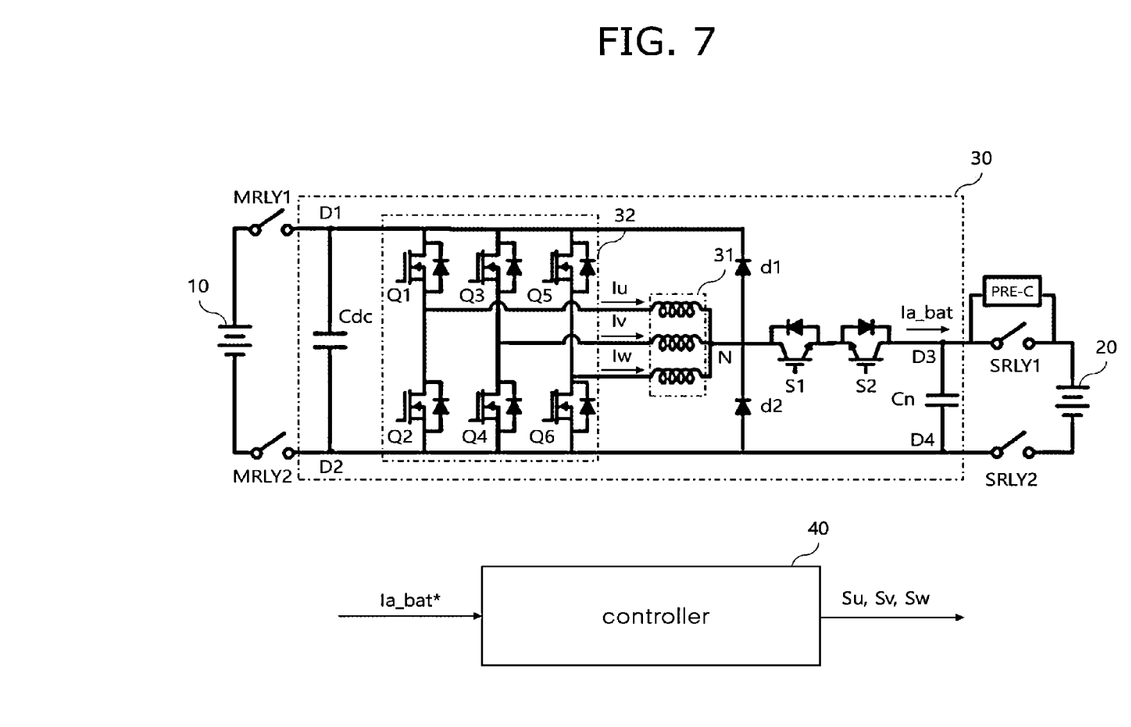
FIG. 7 is a circuit diagram showing a configuration of a motor system according to various exemplary embodiments of the present disclosure.

FIG. 7 is a circuit diagram showing a configuration of a motor system according to various exemplary embodiments of the present disclosure.

Referring to FIG. 7, to reduce the overvoltage of the neutral terminal N when changing from the charging mode while driving to the motor driving mode, the motor system 30 may include a first freewheeling diode d1 connected between the positive electrode of the main battery 10 and the neutral terminal N and a second freewheeling diode d2 connected between the negative electrode of the main battery 10 and the neutral terminal N. In more detail, the anode of the first freewheeling diode d1 is connected to the neutral terminal N, and the cathode thereof may be connected to the positive electrode of the main battery 10. In the second freewheeling diode d2, the anode is connected to the negative electrode of the main battery 10, and the cathode thereof may be connected to the neutral terminal N.

Figure 8:
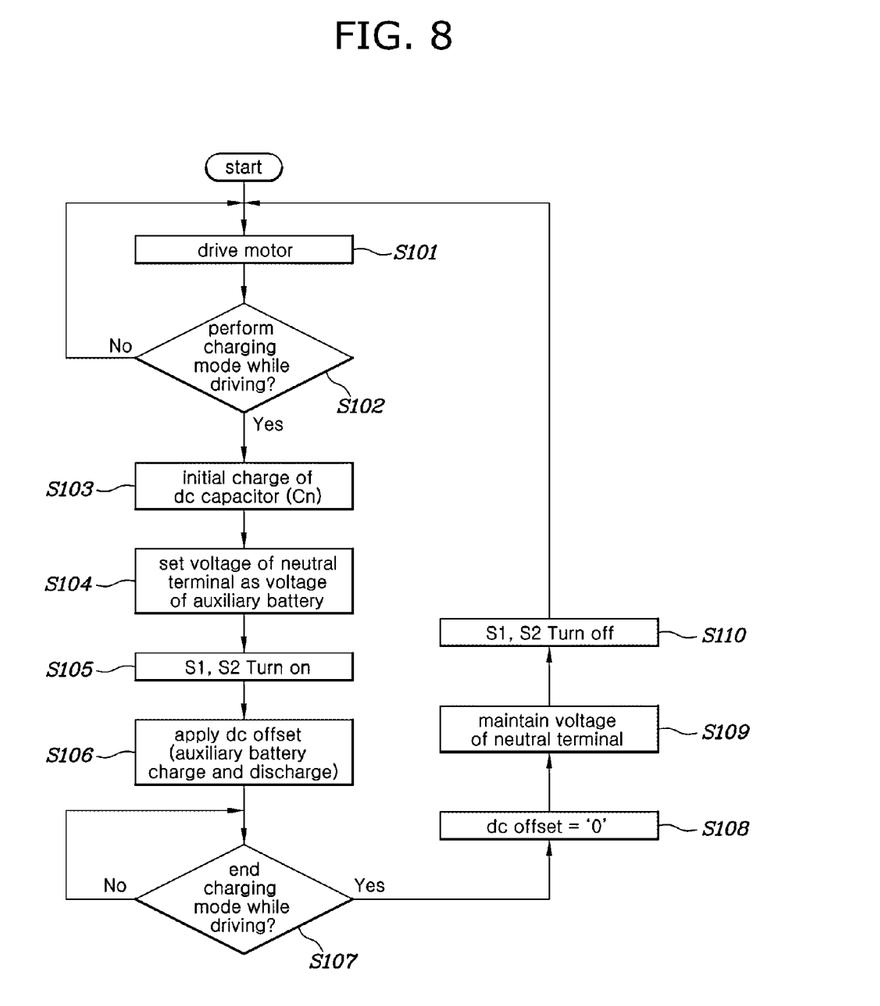
FIG. 8 is a flowchart describing a method for controlling an electrified vehicle according to various exemplary embodiments of the present disclosure.

FIG. 8 is a flowchart describing a method for controlling an electrified vehicle according to various exemplary embodiments of the present disclosure.

Referring to FIG. 8, when the motor driving mode is performed, the motor system 30 may drive the motor 31 through the inverter 32 based on the voltage of the main battery 10 (S101). The charging switches S1 and S2 are in the turn-off state, and the zero current command for the DC offset may be set to '0'.

Thereafter, the controller 40 may be configured to determine whether the charging mode is performed while driving (S102). In the case of the charging mode is not performed while driving (NO in S102), step S101 may be re-performed.

When the charging mode is performed while driving (YES in S102), the controller 40 sequentially is configured to perform S103, S104, and S105, so that the motor driving mode is changed to the charging mode while driving. The controller 40 may initially charge the DC capacitor Cn connected between the positive and negative electrodes of the auxiliary battery 20 through the initial charging circuit PRE-C connected to the auxiliary battery 20 (S103). After initially charging the DC capacitor Cn, the controller 40 may switch each of the legs Q1-Q2, Q3-Q4, and Q5-Q6 to switch the voltage of the neutral terminal N to be set as the voltage of the auxiliary battery 20 (S104). Thereafter, by turning on the charging switches S1 and S2, the controller 40 may electrically connect the positive electrode of the auxiliary battery 20 and the neutral terminal N (S105).

When the charging mode is performed while driving, the controller 40 may apply the DC offset to each of the phase current of the motor 31 having the plurality of phases (S106). The controller 40 divides the value of the charging current command Ia_bat* of the auxiliary battery 20 into the number of phases to generate the zero-phase current command for the DC offset, and through the pulse width modulation control (e.g., SVPWM control or RSPWM control), which is preset based on the zero-phase current command, each of the legs Q1-Q2, Q3-Q4, and Q5-Q6 may be switched. Accordingly, in the case of the DC offset is negative, the motor system 30 discharges the auxiliary battery 20 to charge the main battery 10, and in the case of the DC offset is positive, the main battery 10 is discharged to charge the auxiliary battery 20.

Thereafter, the controller 40 may be configured to determine whether the charging mode is terminated while driving (S107). In the case of the charging mode is not terminated while driving (NO in S107), step S106 may be re-performed.

When the charging mode is terminated while driving (YES in S107), the controller 40 sequentially is configured to perform S108, S109, and S110, so that the charging mode while driving is changed to the motor driving mode. The controller 40 may set the value of zero-phase current command for the DC offset to '0' (S109). Thereafter, the controller 40 maintains the voltage of the neutral terminal N by switching each of the legs Q1-Q2, Q3-Q4, and Q5-Q6 (S110), and turns off the charging switches S1 and S2, so that the positive electrode of the auxiliary battery 20 and the neutral terminal N are electrically separated (S111). Accordingly, step S101 may be re-performed.

Figure 9:
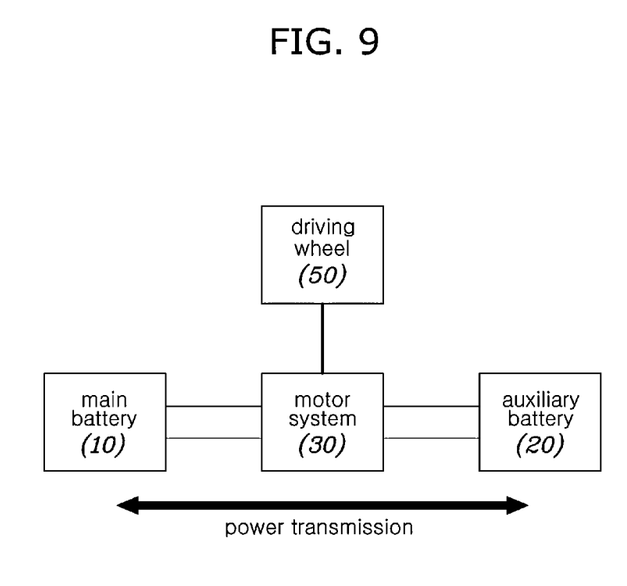
FIG. 9, FIG. 10, and FIG. 11 are block diagrams according to an exemplary embodiment of a motor driving system applied to the present disclosure.
Figure 10:
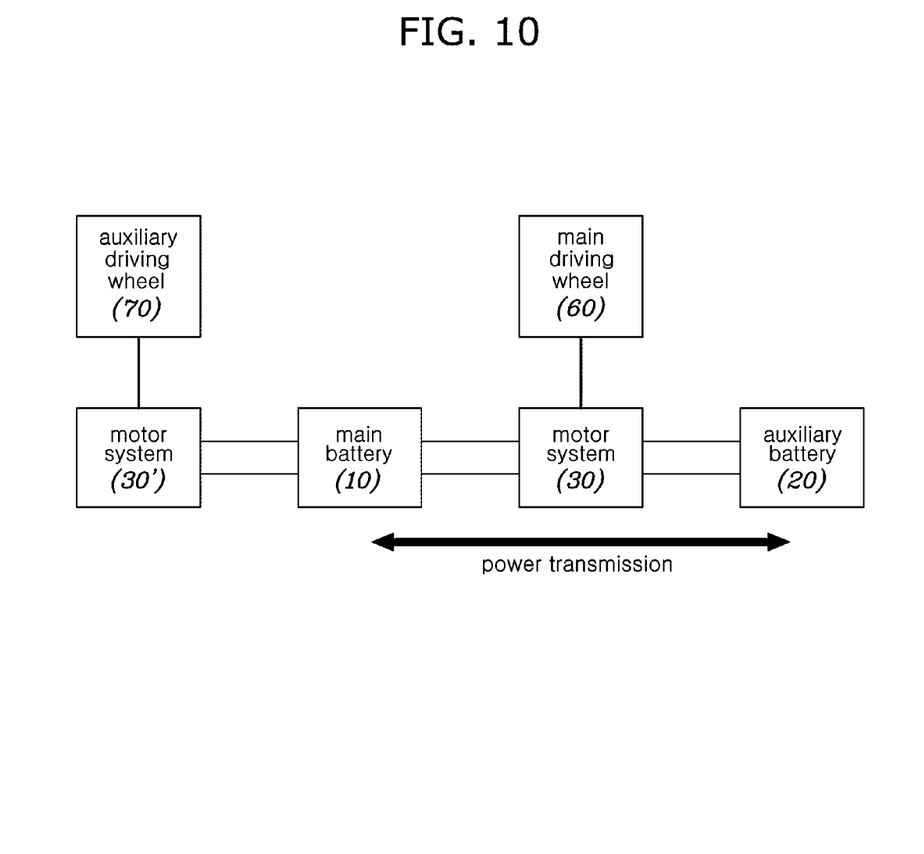
Figure 11:
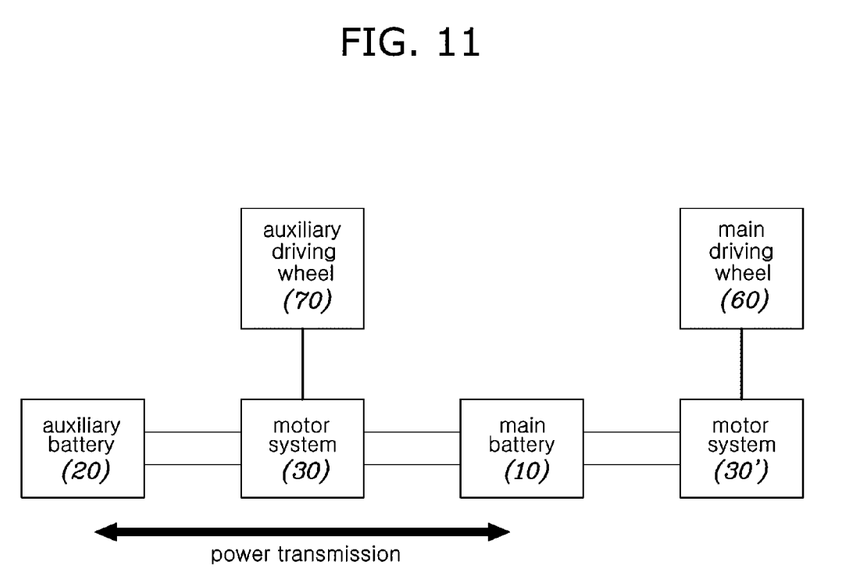

FIG. 9, FIG. 10, and FIG. 11 are block diagrams according to an exemplary embodiment of a motor driving system applied to the present disclosure.

Referring to FIG. 9, the motor system 30 according to the exemplary embodiment may transmit power to a driving wheel 50 (e.g., rear wheel) of a two-wheel drive electrified vehicle based on the voltage of the main battery 10 in the motor driving mode. The motor system 30 may control power transmission between the main battery 10 and the auxiliary battery 20 while transmitting power to the driving wheels 50 in the charging mode while driving.

Referring to FIG. 10, the motor system 30 according to the exemplary embodiment of the present disclosure may be applied to a four-wheel drive electrified vehicle including a main driving wheel 60 (e.g., rear wheel) and an auxiliary driving wheel 70 (e.g., front wheel). The four-wheel drive electrified vehicle always transmits power to the main driving wheels 60 through the motor system 30 while driving based on the voltage of the main battery 10, and power may be selectively transmitted to the auxiliary driving wheel 70 through the motor system 30' according to whether four-wheel drive is performed while driving. The motor system 30 may control power transmission between the main battery 10 and the auxiliary battery 20 while transmitting power to a main driving wheel 60 in the charging mode while driving.

Referring to FIG. 11, the motor system 30 according to the exemplary embodiment may be applied to the four-wheel drive electrified vehicle as shown in FIG. 10. In FIG. 11, the four-wheel drive electrified vehicle always transmits power to the main driving wheels 60 through the motor system 30' while driving based on the voltage of the main battery 10, and power may be selectively transmitted to the auxiliary driving wheel 70 through the motor system 30 according to whether four-wheel drive is performed while driving.

To allow the motor system 30 to control power transmission between the main battery 10 and the auxiliary battery 20 in a state of four-wheel drive is in progress, the charging mode while driving as described above may be performed. However, when the motor system 30 controls power transmission between the main battery 10 and the auxiliary battery 20 while the two-wheel drive is in progress, the auxiliary driving wheel 70 and the motor are disconnected through the disconnector, the DC voltage of the main battery 10 is stepped down and output to the auxiliary battery 20, or the DC voltage of the auxiliary battery 20 may be boosted and output to the main battery 10.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
   a motor including a plurality of windings corresponding to each of phases;
   an inverter including a DC terminal connected to a main battery, and a plurality of legs connected to each end of the windings;
   a charging switch connected between one electrode of an auxiliary battery and a neutral terminal of the motor; and
   a controller configured to turn on the charging switch and to apply a DC offset to each of phase currents of the motor having the phases when a charging mode is performed while driving of the vehicle,
   wherein the motor and the inverter boost a voltage of the auxiliary battery and output boosted voltage to the main battery to charge the main battery, based on the charging mode during the driving of the vehicle being performed.

2. The vehicle of claim 1, wherein the controller is further configured to, when the charging mode is performed during the driving, generate a zero-phase current command for the DC offset by dividing a value of a charging current command of the auxiliary battery into a number of the phases, and switch the plurality of legs based on the zero-phase current command.

3. The vehicle of claim 2,
   wherein the controller is further configured to, when the charging mode is performed during the driving, output a plurality of switching signals for switching each of the legs through a preset pulse width modulation control based on the zero-phase current command, and
   wherein the preset pulse width modulation control is set as one of a space vector pulse width modulation (SVPWM) control or a remote state pulse width modulation (RSPWM) control.

4. The vehicle of claim 2, wherein a charging current of the auxiliary battery includes a DC waveform in which the DC offset is multiplied by the number of the phases.

5. The vehicle of claim 1, wherein the controller is further configured to, when a motor driving mode is performed, turn off the charging switch and set a value of zero-phase current command for the DC offset to '0'.

6. The vehicle of claim 5, wherein the controller is further configured to, when the motor driving mode is changed to the charging mode during the driving, initially charge a DC capacitor connected between positive and negative electrodes of the auxiliary battery through an initial charging circuit connected to the auxiliary battery.

7. The vehicle of claim 6, wherein the controller is further configured to, when the motor driving mode is changed to the charging mode during the driving and after initially charging the DC capacitor, switch each of the legs to set a voltage of the neutral terminal as a voltage of the auxiliary battery, and turn on the charging switch in a turn-off state.

8. The vehicle of claim 5, wherein the controller is further configured to, when the charging mode during the driving is changed to the motor driving mode, a voltage of the neutral terminal is maintained by switching each of the legs, and turning off the charging switch in a turn-on state.

9. The vehicle of claim 1, wherein the charging switch includes:
   a first charging switch in which a first end thereof is connected to the neutral terminal; and
   a second charging switch in which a first end thereof is connected to one electrode of the auxiliary battery,
   wherein the first charging switch and the second charging switch form a common node in which each of second ends of the first charging switch and the second charging switch is mutually connected.

10. The vehicle of claim 1,
    wherein the charging switch includes first and second charging switches connected in parallel between one electrode of the auxiliary battery and the neutral terminal, and
    wherein a first end of the first charging switch and a second end of the second charging switch are connected to the one electrode of the auxiliary battery, and a second end of the first charging switch and a first end of the second charging switch are connected to the neutral terminal.

11. The vehicle of claim 1, further including:
    a first freewheeling diode connected between a positive electrode of the main battery and the neutral terminal; and
    a second freewheeling diode connected between a negative electrode of the main battery and the neutral terminal.

12. A method for controlling a vehicle, the method comprising:
    driving, by a controller, a motor including a plurality of windings corresponding to each of phases through an inverter including a plurality of legs and connected to each end of the windings, based on a voltage of a main battery when a motor driving mode is performed;
    changing, by the controller, the motor driving mode to a charging mode while driving of the vehicle by electrically connecting one electrode of an auxiliary battery and a neutral terminal of the motor; and
    applying, by the controller, a DC offset to each of phase currents of the motor having the phases when the charging mode during the driving is performed,
    wherein the motor and the inverter boost a voltage of the auxiliary battery and output boosted voltage to the main battery to charge the main battery, based on the charging mode during the driving of the vehicle being performed.

13. The method of claim 12, wherein the applying the DC offset including:
generating a zero-phase current command for the DC offset by dividing a value of a charging current command of the auxiliary battery into a number of the phases, and switching the plurality of legs based on the zero-phase current command; and
switching each of the legs based on the zero-phase current command.

14. The method of claim 13,
wherein the switching includes outputting a plurality of switching signals for switching each of the legs through a preset pulse width modulation control based on the zero-phase current command, and
wherein the preset pulse width modulation control is set as one of a space vector pulse width modulation (SVPWM) control or a remote state pulse width modulation (RSPWM) control.

15. The method of claim 12, wherein the changing the charging mode during the driving further including:
charging initially a DC capacitor connected between positive and negative electrodes of the auxiliary battery through an initial charging circuit connected to the auxiliary battery; and
switching, after initially charging the DC capacitor, each of the legs to set a voltage of the neutral terminal as a voltage of the auxiliary battery.

16. The method of claim 12, wherein, in the changing the charging mode during the driving to the motor driving mode, the changing the motor driving mode includes:
setting a value of a zero-phase current command for the DC offset to '0'.

17. The method of claim 16, wherein, in the changing the charging mode during the driving to the motor driving mode, the changing the motor driving mode further includes:
maintaining a voltage of the neutral terminal by switching each of the legs; and
separating electrically the one electrode of the auxiliary battery and the neutral terminal of the motor.

* * * * *